United States Patent [19]

Brand

[11] Patent Number: 4,711,490

[45] Date of Patent: Dec. 8, 1987

[54] INFLATABLE INFANT SEAT

[76] Inventor: Harold E. Brand, 11039 Fenway, Sun Valley, Calif. 91352

[21] Appl. No.: 922,251

[22] Filed: Oct. 23, 1986

[51] Int. Cl.$^4$ ............................................. A47C 1/08
[52] U.S. Cl. ................................... 297/250; 297/377; 297/DIG. 3
[58] Field of Search ................. 297/250, 377, DIG. 3, 297/DIG. 8, 488

[56] References Cited

U.S. PATENT DOCUMENTS

| | | | |
|---|---|---|---|
| 2,700,164 | 1/1955 | Abajian | 297/377 X |
| 4,583,253 | 4/1986 | Hall | 297/250 X |
| 4,601,667 | 7/1986 | Hull | 297/250 X |

FOREIGN PATENT DOCUMENTS

| | | | |
|---|---|---|---|
| 1078724 | 6/1980 | Canada | 297/DIG. 3 |
| 2844628 | 4/1980 | Fed. Rep. of Germany | 297/DIG. 8 |

Primary Examiner—James T. McCall
Attorney, Agent, or Firm—Roger A. Marrs

[57] ABSTRACT

A seat for supporting a child or infant for use in an automobile which is composed of pliable fabric arranged in a unitized or integral manner to define a seat, arm rests, back and front tray or bar. The fabric provides conduits or channels of continuous passages for holding air when pressurized so that the seat is readily inflatable to expand into a pre-formed arrangement for supporting the occupant. Tie-down straps are operably provided between the seat back and the front of the seat for reliably securing the occupant while back straps are provided for carrying the seat on the back of a parent. A separate inflatable compartment is carried on the seat back for use when the seat is intended to support the occupant in a reclining position. Slots in the fabric receive standard safety belts for retaining the seat and its occupant on the auto seat.

3 Claims, 3 Drawing Figures

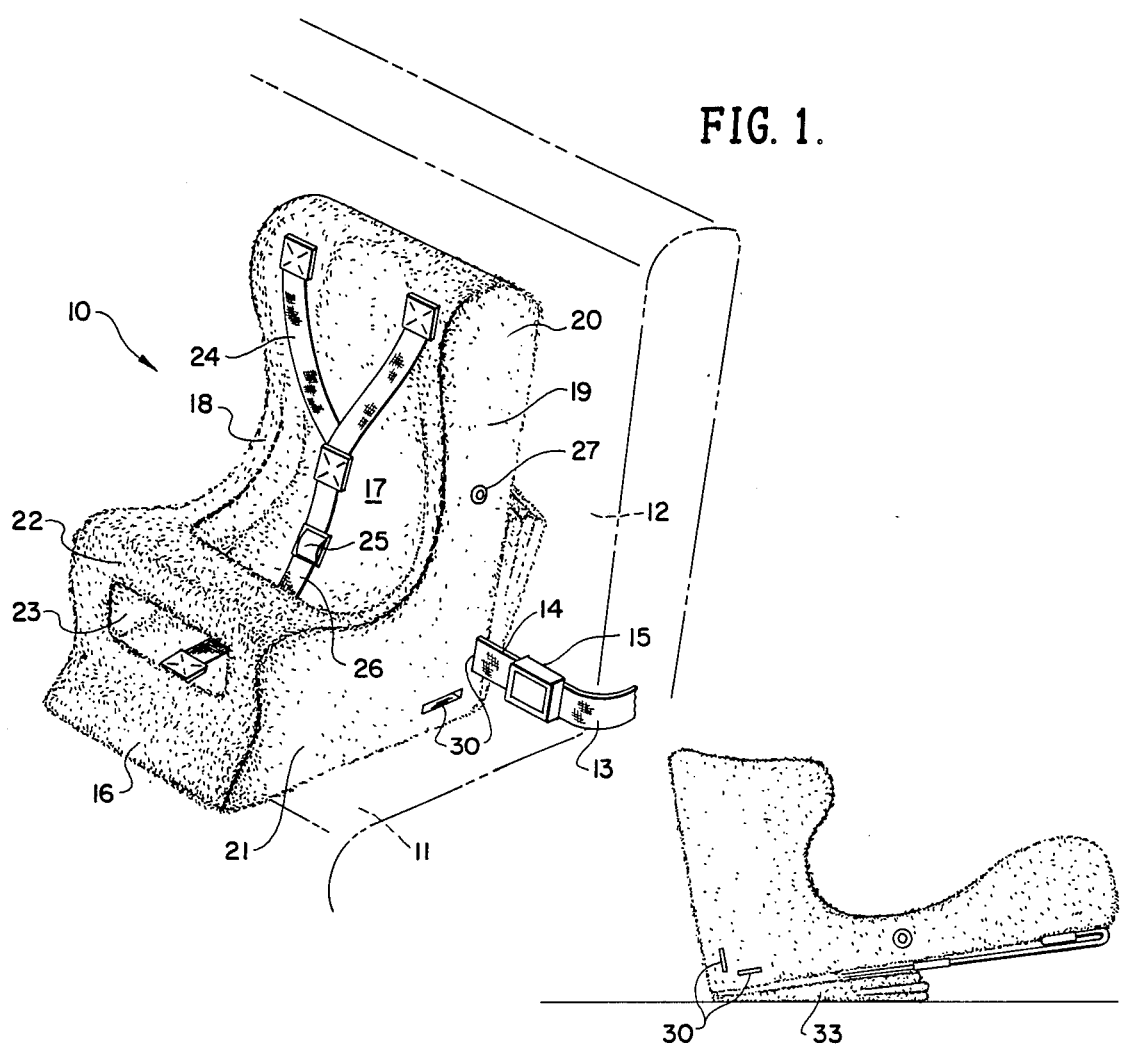
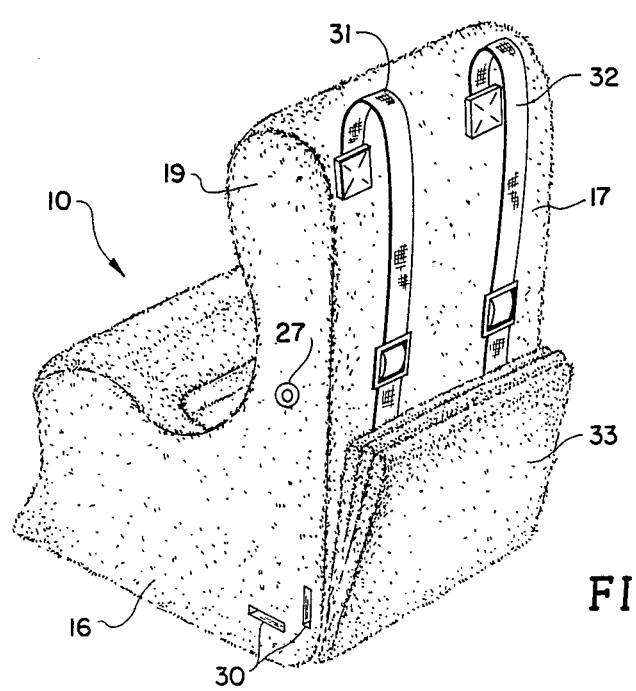
FIG. 1.
FIG. 3.
FIG. 2.

INFLATABLE INFANT SEAT

BACKGROUND OF THE INVENTION

1. Field of the Invention

The present invention relates to inflatable seats and more particularly, to a novel inflatable seat for use in supporting children or infants in a moving vehicle which is composed of pliable material so as to provide a collasped storage condition and an expanded inflatable condition.

2. Brief Description of the Prior Art

In the past, it has been the conventional practice to provide infant or children's seats for automobiles which include a rigid structure adapted to be staped to the auto seat in order to support and hold the occupant in a desired position. Although these seats have been useful in accomplishing their intended ends, these seats are difficult to store when not in use due to their rigid and solid construction. Also, the same rigidity sometimes is uncomfortable to the occupant. Some attempts have been made to accommodate storage by providing collasible seats having a variety of parts which selectively couple and de-couple so as to be reduced in size for storage convience. Many difficulties and problems have been encountered with these types of seats which stem largely from the fact that they are cumbersome to use and is sometimes de-coupled when an occupant is in the seat which destroys the ability of the seat to properly support the occupant.

Furthermore, conventional seats only support the occupant in a sedentary position and are not readily adapted for accommodating the occupant in a prone position. Furthermore, it is of great benefit to such an infant or child seat that use can be made of the standard safety belts available in automobiles for securing the child or infant seat to the seat of the automobile.

Therefore, a long standing need has existed to provide a novel infant or child's seat which may be readily stored in a convenient manner and may be readily deployed into another position for use as a supporting seat in conjunction with a standard auto seat including its available safety harness or belt.

SUMMARY OF THE INVENTION

Accordingly, the above problems and difficulties are obviated by the present invention which provides a novel auto seat for infants and small children adapted to support the occupant on the seat of the automobile. The seat of the present invention is inflatable and includes a rugged and pliable plastic composition which is arranged to provide internal conduits or passage ways for holding pressurized air so as to define a seat, a back, opposite arm rests, a frontal safety bar or tray. means are carried on the fabric for receiving an inflation means suitable to introduce pressurized air to the interior of the fabric so that the fabric may be deployed from a collasped storage position into an inflated operable and infant or child supporting position. The interior of the seat in its inflated position constitutes a plurality of compartments occupied by pressurized air giving form and yeildable rigidity to the seat. The compartments are connected together internally so as to provide a continuous air passage way therethrough. Strap means are connected between the seat back and the seat to releasably to hold the occupant in position while a slot formed in the material of the seat readily accepts the standard safety belt to hold the seat and its occupant to vehicle. A pleated cushion is carried externally on the back of the seat for deployment when desired to place the occupant in a prone position.

Therefore, it is amoung the primary objects of the present invention to provide the a novel infant seat which is inflatable and will readily accept the standard safety belt arrangement in an automobile for tie down purposes.

Another object of the present invention is to provide a novel seat for a child or an infant suitable for deployment from a collasped storage position into an expanded useage position by means of inflating the closed fabric of the seat and which further includes harness means for holding the occupant to the seat while providing means receptive to the standard safety seatbelt for holding the seat and its occupant to the vehicle.

Still another object of the present invention is to provide a novel inflatable carrier for a toddler, infant or child which includes a harness means for holding the occupant to the seat and which includes strap means available to the user for supporting the occupant in the seat on his back for carrying purposes.

Still a further object of the present invention is to provide a novel inflatable seat for an infant or a child having a collasped position for storage and an inflated or expanded position for use whereby the child or infant maybe readily supported on a seat of an automobile while moving.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front perspective view of the novel inflatable infant seat incorporating the present invention;

FIG. 2 is a rear perspective view of the seat shown in FIG. 1; and

FIG. 3 is a side elevational view of the seat shown in FIGS. 1 and 2 and further illustrating the seat in orientation to support the occupant in a prone position.

DESCRIPTION OF THE PREFERRED EMBODIMENT

Referring to FIG. 1, the novel inflatable seat of the present invention is illustrated in the general direction of arrow 10 which is supported on a seat 11 in an automobile. Seat 11 includes a back 12 which is arranged substantially normal to the seat 11 and is the conventional form. Additionally, the seat 11 further inclued a standard safety belt arrangement comprising a pair of straps 13 and 14 which are joined together by a releasable buckle 15.

The inflatable seat 10 is formed from a rubberized, pliable plastic dashlike material which is adhesively connected together to provide a plurality of compartments defining regular areas of a seat. Numeral 16 indicates the bottom of the seat which is intended to rest on the seat 11 while numeral 17 pertains to the back of the seat and numerals 18 and 19 refer to the opposite sides of the seat. The opposite sides 18 and 19 include an upper expandable portion 20, for example which is intended to protect the head of the occupant while lower portions 21 protect the legs and lower torso of the occupant. Numeral 22 represents a frontal bar or tray which extends between the lower portions 21 of the respective side portions 18 and 19. The frontal bar 22 is used to separate the occupant from any impingement or abutment of the dash board in the event of an automotive collision. A space 23 is defined between the frontal bar 22 and the lower seat 16 which accommodates the legs of the occupant when installed in the seat. A harness 24 comprising Y-shaped straps which downwardly suspend from the upper portion 20 of the seat back 19 to terminate in a buckle 25 and a leg strap 26 which terminates at its opposite end at the seat 16.

Means for inflating the fabric of the seat may include a check valve 27 suitable for receiving a pump or other inflation device. However, it is to be understood that an oral inflation means may be provided so that the user may inflate by blowing through the means into the intertior of the seat. Also, this inflation means may include a conventional release for permitting presurized air to escape when it is desired to collapse the seat for storage purposes. Therefore, it can be seen that the seat may be readily inflated or deflated so as to convert the seat readily from a collasped storage position into a semirigid inflated or expanded position.

It can also be seen that the strap 14 of the standard safety belt arrangement is passed through a slot 30 which extends across the back of the seat from one side to the other. When the seat is installed, the end of strap 14 is passed through the slot 30 and then it is connected to the buckle 15. This arrangement holds the seat in place and in position while the vehicle is moving. The lower portion of the seat back is thickened so as to provide the slot 30 in such a way that the strap 14 will not tear or rip through the material.

Referring now in detail to FIG. 2, it can be seen that the back 17 is provided with shoulder straps 31 and 32 intended to be conveniently worn by a person carrying the seat on his back. In this manner, the auto seat becomes a carrier for transporting the occupant not only in a secure position on the seat 11 but in a secure position on the back of a person. Also, the belt of the person carrying the seat may be passed through the slot 30 for additional support and stability.

Referring now in detail to FIG. 3, it can be seen that the seat 10 may be employed to support the occupant in a prone or reclining position. This is achieved by inflation of an expandable cushion portion identified by numeral 33 which is shown in a collapsed position in FIGS. 1 and 2. The pouch or pillow 33 is pleated across its upper end so as to be readily expandable when inflated. Inflation can be achieved by either incorporating a selective valve conduit with the interior of the seat itself or by a separate inflation means. When inflated, pounch 33 expands primarily along its top edge marginal region and extends to the position shown in FIG. 3. While in this position, the occupant of the seat is readily supported in a prone orientation.

In view of the foregoing, it can be seen that the inflatable seat of the present invention provides a novel means for supporting an occupant in either a secured position on the seat of a car or in a secure position on the back of a person carrying the seat and occupant. Features are also included which permit supporting the occupant in a sedentary position as well as in the prone position. The occupant is protected not only on the opposite sides, the back and the seat but by the cross bar for frontal bar 22 as well. The various limits of edge marginal regions and periphery of the seat protect the occupant from any infringement or abutting engagements with components of the auto or debris or the like which may approach the occupant. The occupant is intentionally suggeled deep in the protective confines of the seat and only direct frontal exposure to the upper torso is possible.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed:

1. In an inflatable, portable infant or child seat arrangement for supporting a seated occupant in either an upright or a reclined position and being adapted to receive a standard seat belt for holding the seated occupant in either positioning, the combination comprising:

a pliable fabric material arranged in a unitary construction to provide a seat, a back, opposite sides and a frontal bar connecting said opposite sides;

said unitary seat construction defining internal pressurized air compartments establishing said seat in an expanded or inflated condition to support the occupant;

means provided on said seat construction for inflating thereof and deflation thereof between a first operational expanded condition and a second deflated storage condition;

slot means on said unitary seat construction cooperating with said standard seat belt securement arrangement for releasably retaining said seat construction on a conventional auto seat in either of its upright or reclined positions;

an inflatable pouch separate from said internal pressurized air compartments carried on the exterior of said back for maintaining said unitary seat construction including the occupant in a prone third position; and back straps carried on said seat back for supporting said unitary seat construction from the shoulders of a person carrying said seat construction and the occupant thereof.

2. The invention as defined in claim 1 wherein: said slot means includes a pair of slots arranged normal to each other extending in parallel spaced relationship through said seat and said back respectively in close proximity to each other.

3. The invention as defined in claim 2 wherein: said inflatable pouch is constructed of multiple accordion folds and extends from said seat to a location midway along said back.

* * * * *